Figure 1:
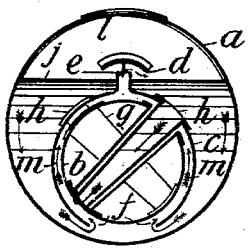

No. 739,774. PATENTED SEPT. 22, 1903.
L. C. AULDJO.
STEAM BOILER.
APPLICATION FILED JUNE 30, 1902.
NO MODEL. 3 SHEETS—SHEET 1.

Witnesses
W. Walker
F. W. Smith

Inventor.
Louis Carnegy Auldjo

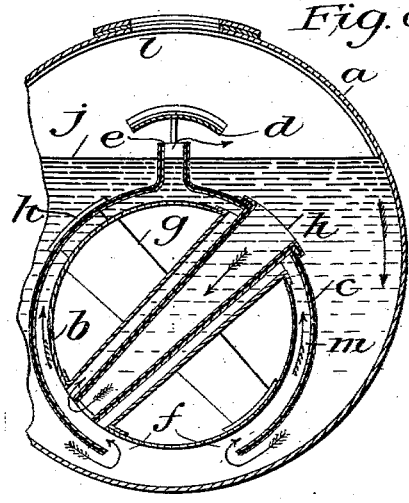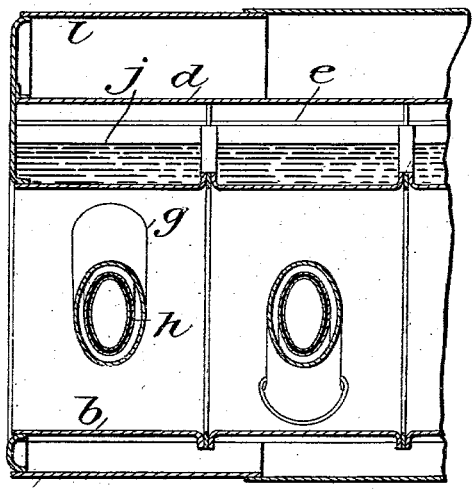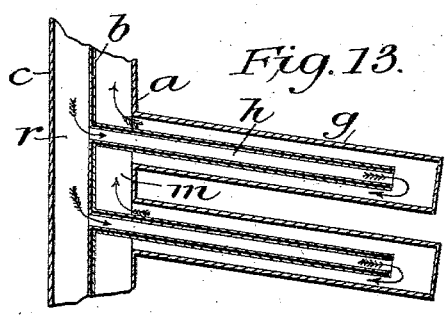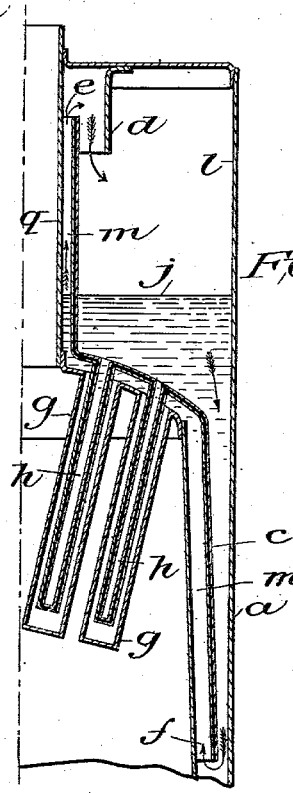

No. 739,774. PATENTED SEPT. 22, 1903.
L. C. AULDJO.
STEAM BOILER.
APPLICATION FILED JUNE 30, 1902.
NO MODEL. 3 SHEETS—SHEET 3.
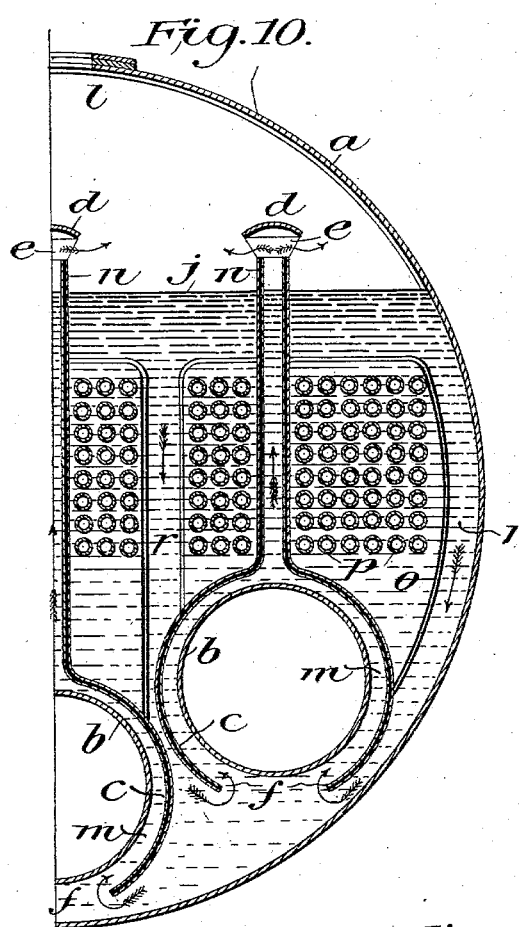
Fig. 10.
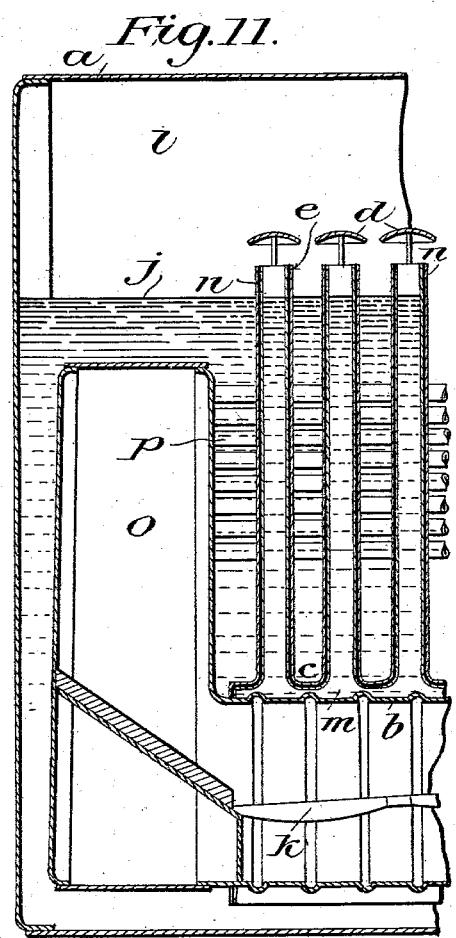
Fig. 11.
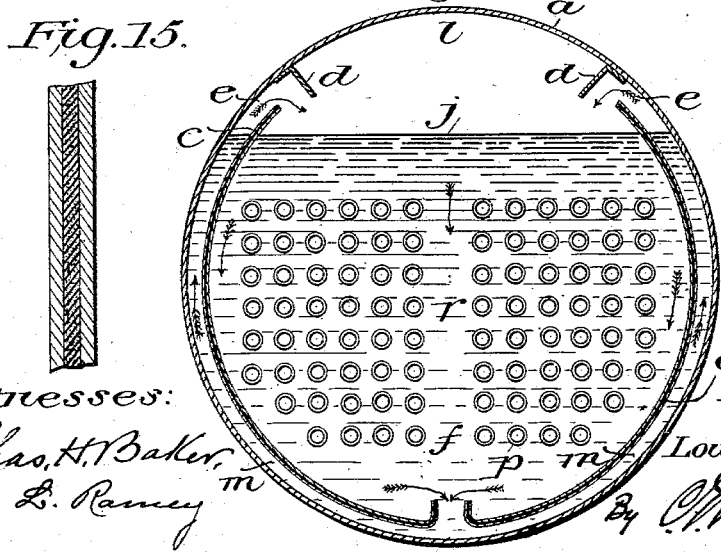
Fig. 12.
Fig. 15.  Fig. 16.
Witnesses:
Chas. H. Baker,
H. L. Ramey
Inventor:
Louis Carnegy Auldjo
By C. P. Hawley
Associate Attorney No. 739,774. Patented September 22, 1903.

UNITED STATES PATENT OFFICE.

LOUIS CARNEGY AULDJO, OF SYDNEY, NEW SOUTH WALES, AUSTRALIA.

STEAM-BOILER.

SPECIFICATION forming part of Letters Patent No. 739,774, dated September 22, 1903.

Application filed June 30, 1902. Serial No. 113,776. (No model.)

*To all whom it may concern:*

Be it known that I, LOUIS CARNEGY AULDJO, a subject of the King of Great Britain and Ireland, residing at Victoria street, Ashfield, Sydney, New South Wales, Australia, (whose post-office address is Equitable Building, George street, Sydney, aforesaid,) have invented certain new and useful Improvements in Steam-Boilers, of which the following is a full, clear, and exact description.

This invention relates to boilers used for the generation of steam, and I do not confine myself to any particular class of steam-boiler, as my invention can with advantage be applied to most all of the best known existing types.

The aim of my invention is the rapid production of steam and a constant active circulation of the water in the boiler, by which the steaming capacity is increased and the fuel consumption reduced, while at the same time the formation of scale and overheating of the plates is prevented.

My object is attained by concentrating the heat generated in the furnace only upon a limited quantity at a time of the water in the boiler, the result being that the water commences to circulate immediately after the fire is started, and steam is thus rapidly produced. I obtain these results by means of a non-heat-conducting jacket, which incloses a limited quantity of water in actual contact with the furnace-plate, insulating and isolating it from the rest of the water in the boiler, excepting at the inlet, which is at or near the bottom of the boiler, while the outlet is carried into the steam-space, preferably above the working water-level. There is provided where necessary in the steam-space a baffle-plate, which separates and throws down any water carried up with the steam. The insulated jacket may be constructed of plates or tubes or a combination of them of metal or other suitable material designed to suit the particular boiler to be fitted, and the insulation can be effected by means of any of the numerous materials commonly used to prevent the transmission of heat, such as non-conducting paints, paper, felt, asbestos, slag-wool, carbon, mica, fats, grease, or inclosed air-spaces.

Special care in the construction of the jacket must be taken, so as to make it as perfect a non-heat conductor as possible, and with this object the insulating material used should be coated or otherwise treated to prevent its absorption of moisture, or the material may be inclosed between plates or tubes and so sealed as to prevent its contact with water or steam.

The insulated jackets or tubes may be made in suitable sections to pass through a manhole in the boiler-shell and can be secured so as to be easily removed for inspection or cleaning. Care must be taken that the sections are securely fastened together and to the boiler, as the results will depend upon the more or less perfect isolation and insulation of the confined water.

The space to be inclosed by the insulated jacket or tube should preferably be made decreasing in area from the inlet to the outlet, so as to insure a full supply of water and to accelerate the movement toward the outlet.

The insulated jackets or tubes may be constructed to inclose so small a quantity of water that practically the whole of it is converted into steam before it passes into the steam-space; but where a more vigorous circulation through the boiler is desired this can be attained by increasing the space in the area inclosed, as it is evident the smaller the quantity of water confined the more rapidly will steam be generated.

The water to replace that which has been converted into steam being drawn up from the bottom of the boiler, a more even temperature throughout is obtained, unequal expansion and consequent straining of the plates much reduced, and the life of the boiler prolonged.

In starting some boilers where the too-quick production of steam would tend to produce unequal expansion, due to the difference in temperature between the top and bottom of the boiler, it is optional to raise the water-level above the insulated-jacket outlet, in which case practically no steam will be generated until all the water has arrived at boiling-point, though if imperative at any time to raise steam quickly it can be done by lowering the water-level in the boiler below the insulated-jacket outlet.

My invention can be applied to boilers in which Field tubes are used. The inner circulating-tube is then fixed to the insulated jacket which confines the water next to the furnace, this inner tube being also preferably insulated. The outer tube, which is exposed to the direct furnace-heat, is fixed to the furnace-plate in the usual way.

My invention can also be applied to water-tube boilers using concentric tubes. The insulating of the inner circulating-tubes and of the center partition or dividing-plate into which these tubes are fixed by preventing the dissipation of the heat insures a more certain and rapid circulation and lessens the risk of water-hammer and of overheating.

My invention also applies to boilers fitted with Galloway tubes. An inner insulated tube is fitted so as to inclose a space between the two tubes, the top end of the inner tube being connected to the insulated jacket which incloses the furnace, and the lower end is left free, so that when at work the water will pass downward through the inner tube and then upward between the two tubes and be finally guided by the insulated jacket into the steam-space.

By my method of construction the full head of water in the boiler is continuously utilized to replace that which is converted into steam or carried over into the steam-space. The vigorous circulation thus created sweeps the steam-bubbles along as quickly as they are formed and brings water in contact with the furnace-plates. The scour set up also prevents the formation of scale.

The risk of overheating the furnace-plates is considerably reduced, because speed of circulation responds to every variation of temperature in the furnace, even when working under forced conditions, and it is possible to force the fires as soon as they are started and also to safely and advantageously burn a much larger quantity of fuel in the furnace in a given time than otherwise would be safe or practicable.

My invention lessens the risk of burning the furnace-plates through shortness of water, because when heated the water confined by the insulated jacket, owing to the difference in its density caused by the admixture of steam-bubbles and its higher temperature, will always rise much above the level of the other water in the boiler, and thus keep the furnace-plates covered, even when the water has fallen considerably below what would otherwise be reckoned a safe working level.

To facilitate the explanation and understanding of my invention, I submit drawings, showing the application of my invention to several of the best known types of steam-boilers.

Figure 2:
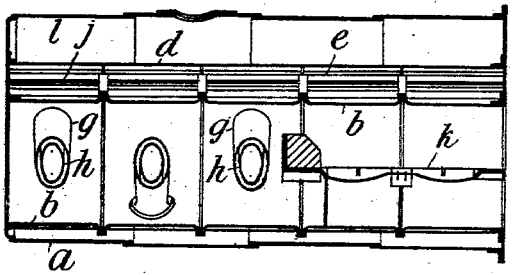
Figure 3:
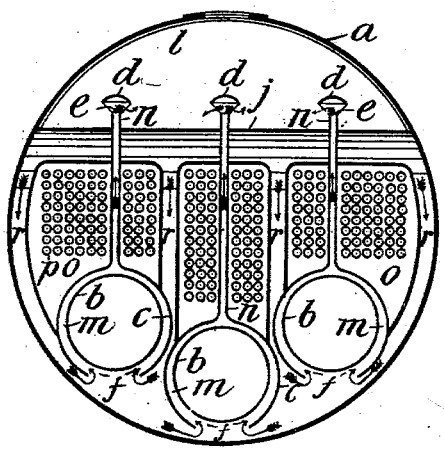
Figure 4:
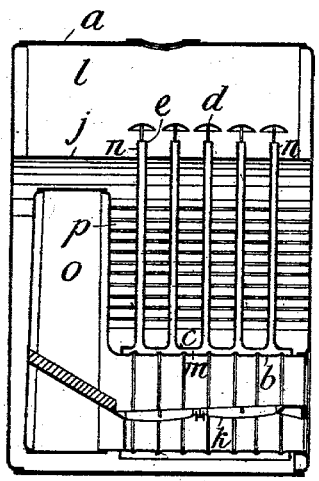
Figure 5:
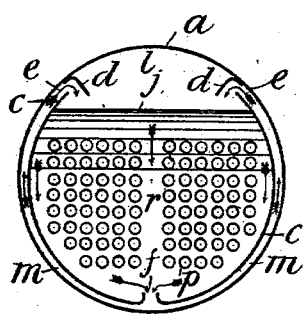
Figure 6:
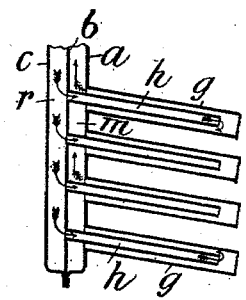

Figures 1 and 2 represent a cross-section and a longitudinal section through a Cornish boiler. Figs. 3 and 4 show a cross-section through a return-tube marine boiler having three furnaces. Fig. 5 is a cross-section of an externally-fired multitubular boiler. Fig. 6 is part section of a water-tube boiler, and Fig. 7 a section through a vertical boiler fitted with Field tubes. Figs. 8 and 9 are enlarged detail views taken from Figs. 1 and 2 and showing the construction of the insulating jackets and tubes. Figs. 10 and 11 are similarly-enlarged views taken from Figs. 3 and 4 and showing the construction and arrangement of the jackets therein. Fig. 12 is an enlarged view taken from Fig. 5, showing the insulated jackets $c$ in detail. Fig. 13 is an enlarged view taken from Fig. 6 to better illustrate the construction of the insulated tubes and also that of the insulated partition in the water space, leg, or head of the boiler. Fig. 14 is an enlarged view taken from Fig. 7 to show the construction of the jacket used therein, and Figs. 15 and 16 are enlarged views of sections of insulated jackets.

In different views of the same boiler like letters designate like parts.

I will now more fully describe the various drawings.

In the Cornish boiler, Figs. 1, 2, 8, and 9, $a$ is the boiler-shell, $b$ the furnace-tube, built with Adamson's joints and fitted with three Galloway tubes $g$; $k$ being the fire-bars. The Galloway tubes $g$ have internal insulated tubes $h$ secured to the insulated jacket $c$, which incloses the space $m$ on each side of the furnace-tube. $f$ is the inlet at the bottom of the insulated jacket $c$, and $e$ the outlet at the top, carried above the water-level $j$. The baffle-plate $d$ separates and returns the water thrown into the steam-space $l$. The arrows indicate the direction in which circulation takes place.

In the return-tube marine boiler, Figs. 3, 4, 10, and 11, $a$ is the boiler-shell, having the furnaces $b$ and combustion-chambers $o$. The boiler-tubes are marked $p$, the water-spaces $r$, and the fire-bars $k$. In each case an insulated jacket $c$ incloses the space $m$ outside the furnace and has an opening $f$ at the bottom and insulated circulating-tubes $n$ extending above the water-level $j$. The water and steam issue at $e$, and are separated by the baffle-plates $d$ in the steam-space $l$. The direction of circulation is indicated by the arrows. In place of the insulated circulating-tubes $n$ being taken up through the nest of tubes $p$, as shown, they may be bent so as to pass through the water-spaces $r$, and instead of the insulated circulating-tubes $n$ the insulated jackets $c$ may be carried up to guide the confined water and steam above the water-level $j$.

In the externally-fired boiler, Figs. 5 and 12, $a$ is the boiler-shell, $p$ the boiler-tubes, and $r$ the water-space. $c$ $c$ are the insulated jackets, one on each side, defining the spaces $m$ and having the inlets $f$ at the bottom and the outlets $e$ at the top, carried above the water-level $j$. The baffle-plates $d$ separate the water and steam in the steam-space $l$. The arrows indicate the direction of circulation.

In Figs. 6 and 13 part of a water-tube boiler is shown, in which $c$ is the outer plate, $a$ the inner plate, to which are secured the outer tubes $g$. $b$ is the central insulating dividing-plate, to which are fixed the insulated internal tubes $h$. The outer inclosed space is marked $r$, and the inner one $m$. The arrows indicate the direction of flow.

Figure 7:
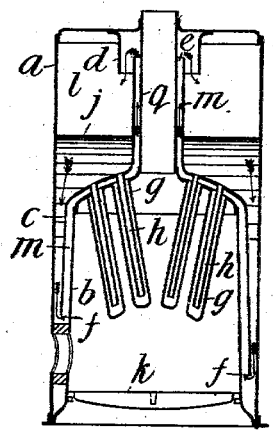

Figs. 7 and 14 represent a vertical boiler, in which $a$ is the boiler-shell, $b$ the furnace, $q$ the uptake, and $k$ the fire-bars. The insulated jacket $c$ incloses both furnace and uptake and extends above the water-level $j$ into the steam-space $l$ and has a baffle-plate $d$. The water passes into the inclosed space $m$ by the opening $f$ at the bottom and overflows at $e$. Field tubes $g$ are shown secured to the furnace-plate $b$ and have insulated internal tubes $h$, which are secured to the insulated jacket-plate $c$. The arrows indicate the direction in which the water flows, and it will be noticed that the uptake $q$, which in ordinary vertical boilers gives trouble by being overheated, is kept cool by the water surrounding it.

In Fig. 15 I have illustrated one of the forms in which the insulated jacket, partition, wall, or tube may be made. I prefer, as therein shown, to place a thickness or layer of insulating material of any of the kinds hereinbefore specified between two plates $y\ y$, of metal. These plates are securely fastened upon the thickness of insulating material and prevent the access of water thereto. In place of a wall, partition, or jacket of this construction I may use one that is wholly composed of insulating material, or I may use one which comprises a simple metal plate that is coated with insulating material upon one or both sides.

Where porous insulating material is used alone or in conjunction with a metal plate or plates, I prefer to protect its surfaces by coating it with paint or the like.

The insulated partition, plate, jacket, or wall, whatever its form, is intended to and in practice does prevent the transmission or passage of the heat from the space which such wall defines to the adjacent main space and the body of water therein. It may therefore be truly said that the jacket does completely insulate the steam and water circulating space or passage from the main space of the boiler. This statement applies to the lateral radiation of heat only, for it will be obvious that it is not intended to mean that the space or passage is closed at top and bottom, it being necessary in all cases to provide for an intake at the lower end of the passage and for a discharge at its upper end. Such communication with the main body of water in the boiler makes the water space or passage a channel not only for water and steam, but also for heat, for the partition or wall which lies between the furnace-plate and the main body of water in the boiler prevents any direct diffusion of the heat which initially enters said passage. As a result the steam which rises from the passage will be practically dry, not having to come into contact with or pass through the cooler main body of water.

The term "furnace-plate" as used hereinafter is intended to mean and define any part of a boiler which is exposed to applied heat.

The terms "jacket," "partition," "insulated plate," and the like as hereinafter used are intended to mean the poor conductor or non-conducting wall or walls of a water and steam passage which has its remaining or other wall constituted by the furnace-plate or other heating-surface of the boiler, whatever the form.

The term "insulating material" as employed hereinafter is intended to mean any insulating material, any insulating composition, or any insulating structure suitable for the purpose.

The term "boiler-shell" as used hereinafter is intended to mean the external containing-shell of the boiler, including the flues, plates, and other parts which are exposed to the applied heat, whatever the form or type of the boiler, and likewise the terms "parallel with" and "adjacent to the furnace-plate" are intended to mean and define the substantially parallel arrangement of the insulated jacket, wall, partition, or tube with relation to the adjacent furnace-plate or heated part of the boiler.

I wish it to be distinctly understood that the chief feature of my invention is the insulating with non-heat-conducting material of jackets, partitions, walls, or tubes inside a steam-boiler.

Having now particularly described and ascertained the nature of my said invention and in what manner the same is to be performed, I declare that what I claim is—

1. A steam-boiler containing a steam and water space, upon its furnace-plate, which space is open at its upper and lower ends and is isolated from the remainder of the boiler by an interposed jacket, partition, or wall, of insulating material.

2. In a steam-boiler, a wall of insulating material dividing the boiler into a downgoing water-space and an upgoing water-space.

3. In a steam-boiler, a wall of insulating material dividing the boiler into a downgoing water-space and an upgoing water-space, the latter surmounting the furnace plate or portion of the boiler.

4. In a steam-boiler, a wall of insulating material substantially impervious to water and dividing the boiler into a downgoing water-space and an upgoing water-space, the latter surmounting the furnace plate or portion of the boiler.

5. In a steam-boiler, a wall of insulating material which divides the boiler into a downgoing water-space and an upgoing water-space, the latter having the furnace-plate of the boiler for one of its walls.

6. In a steam-boiler, a wall of insulating material which divides the boiler into a downgoing water-space and an upgoing water-space, the latter having the furnace-plate of the boiler for one of its walls, the other wall extending upward into the steam-space of the boiler.

7. In a steam-boiler, the boiler-shell having a plate for exposure to heat, in combination with an insulated jacket parallel with said part or plate and forming within the shell a water-circulating and steaming space that is open at its upper and lower extremities.

8. In a steam-boiler, the boiler-shell, in combination with means compelling the flow of water and steam upon the furnace-plate of the boiler and preventing the lateral penetration of heat to the main water-containing part of the shell.

9. In a steam-boiler, the boiler-shell, in combination with a partition, wall, or jacket, arranged therein and impervious to heat and the flow of water, said wall being adjacent to the interior surface of the shell and isolating a water-passage from the main space within the shell.

10. In a steam-boiler, the boiler-shell in combination with an internal jacket, said jacket being impervious to heat and isolating a water-passage which has said shell form one of its walls and which said passage communicates with the interior of said shell only at its upper and lower extremities.

11. In a steam-boiler, the shell having a part or plate to be exposed to heat, in combination with means within the shell dividing the same into a main water and steam containing space, and a smaller auxiliary water-circulating and steaming space, said means being impenetrable by water and heat whereby the initial effect of the heat supplied to the boiler is confined to said auxiliary space.

12. In a steam-boiler, the shell containing a water-circulating and steaming space, having its external wall formed by the furnace-plate of the shell and having its internal wall or walls formed of insulating material, and said space communicating with the interior of the shell at the top and bottom thereof.

13. In a steam-boiler, a boiler-shell, containing a water-passage, having one of its walls formed by a heat-transmitting portion of the shell and having another wall that is a poor conductor of heat, substantially as described.

14. In a steam-boiler, the boiler-shell, in combination with a water-passage within the same having one of its walls formed by the furnace-plate of said shell and having another wall that is a poor conductor of heat and which is tightly joined to the said furnace-plate save at the top and bottom of said passage, substantially as described.

15. In a steam-boiler, a non-heat-conducting jacket adapted to inclose a limited quantity of water in actual contact with a furnace-plate, insulating and isolating it from the rest of the water in the boiler save at the lower part of the boiler and permitting the discharge of steam and water into the upper part of the boiler.

16. In a steam-boiler, the boiler-shell, in combination with a wall, partition, or jacket, arranged within the shell, in proximity to the furnace-plates thereof, said wall or jacket being composed of sheets of metal and interposed insulating material.

17. A steam-boiler having its plates which are exposed to furnace-heat, protected from scale by insulating-jackets, which said plates form water-circulating and steaming spaces that communicate at top and bottom with the main water-space of the boiler.

18. In a steam-boiler, the combination with the steam and water containing space having a portion or wall adapted to have heat applied thereto, of a plate or jacket of heat-insulating material in proximity thereto but spaced therefrom forming a contracted water-containing space insulated from the main body of water in the boiler and having a water-inlet and steam-outlet and a baffle-plate in proximity to said outlet, substantially as described.

In witness whereof I have hereunto set my hand in presence of two witnesses.

LOUIS CARNEGY AULDJO.

Witnesses:
W. WALKER,
F. W. SMITH.